US005182063A

United States Patent [19]

Lang et al.

[11] Patent Number: 5,182,063

[45] Date of Patent: Jan. 26, 1993

[54] METHOD AND MEANS OF PUBLISHING IMAGES HAVING COLORATION AND THREE-DIMENSIONAL TEXTURE

[75] Inventors: Stefan Lang, Scarborough; Harvey Kalef, Toronto, both of Canada

[73] Assignee: Artagraph Reproduction Technology Incorporated, Canada

[21] Appl. No.: 545,658

[22] Filed: Jun. 29, 1990

Related U.S. Application Data

[63] Continuation-in-part of Ser. No. 507,743, Apr. 12, 1990, abandoned.

[51] Int. Cl.[5] .............................................. B29C 33/40

[52] U.S. Cl. .................................. 264/132; 264/162; 264/220; 264/227; 264/255

[58] Field of Search ............... 264/219, 220, 227, 132, 264/162, 255

[56] References Cited

U.S. PATENT DOCUMENTS

| | | | |
|---|---|---|---|
| 36,821 | 10/1862 | Poitevin | 264/227 |
| 2,765,512 | 10/1956 | Nesbit | 264/28 |
| 3,565,978 | 2/1971 | Folger et al. | 264/227 |
| 3,846,533 | 11/1974 | Carrier | 264/220 |
| 3,917,786 | 11/1975 | Weigert | 264/227 |
| 3,989,790 | 11/1976 | Bruner et al. | 264/225 |
| 4,001,062 | 1/1977 | Iisaka et al. | 264/132 |
| 4,091,154 | 5/1978 | Hirai | 264/129 |
| 4,120,930 | 10/1978 | Lenelson | 264/225 |
| 4,285,744 | 8/1981 | Rudolph et al. | 264/220 |
| 4,308,224 | 12/1981 | Becker | 264/220 |
| 4,971,743 | 11/1990 | Lang | 264/132 |

FOREIGN PATENT DOCUMENTS

| | | |
|---|---|---|
| 990506 | 6/1976 | Canada . |
| 2904194 | 9/1979 | Fed. Rep. of Germany . |
| 1493516 | 7/1967 | France . |
| 1548337 | 10/1968 | France . |
| 51-59515 | 5/1976 | Japan . |
| 57-126624 | 8/1982 | Japan . |
| 1107401 | 3/1968 | United Kingdom . |

*Primary Examiner*—Jay H. Woo
*Assistant Examiner*—Robert B. Davis
*Attorney, Agent, or Firm*—Hill, Van Santen, Steadman & Simpson

[57] ABSTRACT

A method of faithfully reproducing a multicolor image having three-dimensional texture utilizes a photomechanically reproduced copy of the image on a carrier substrate which is suitable for embossing and a matrix providing the three-dimensional textured characteristics of the image is used to electrolytically form a female embossing die corresponding to the shape of the matrix whereupon a complemental male embossing die is made by which the carrier may be squeezed between the male and female dies to produce a highly accurate copy exhibiting the coloration and fine detail of the image texture.

34 Claims, 4 Drawing Sheets

FIG. 1
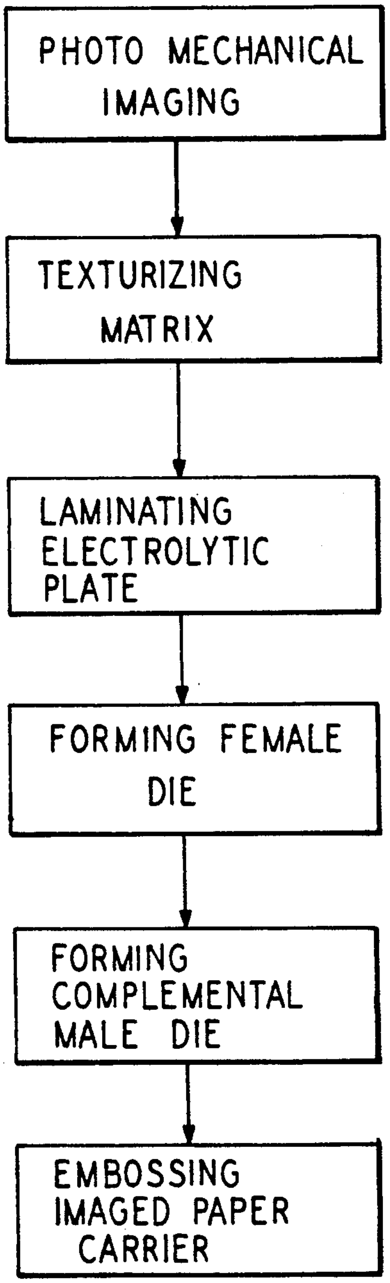
FIG. 2
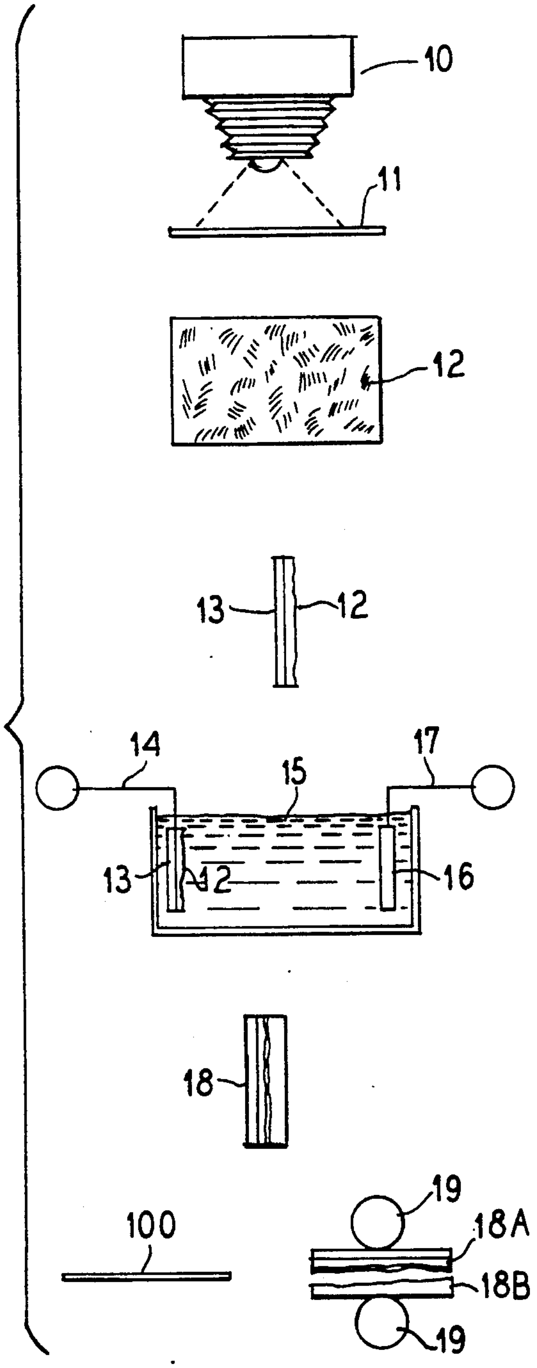
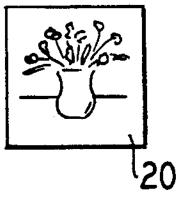
FIG. 3
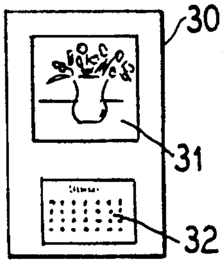
FIG. 4
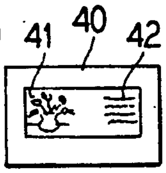
FIG. 5
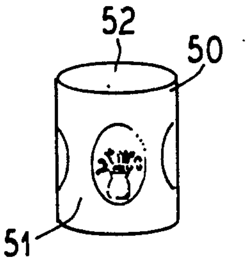
FIG. 6
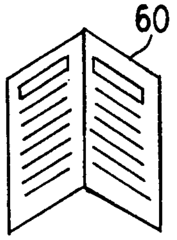
FIG. 7

METHOD AND MEANS OF PUBLISHING IMAGES HAVING COLORATION AND THREE-DIMENSIONAL TEXTURE

RELATED APPLICATION DATA

The present application is a continuation-in-part of U.S. patent application Ser. No. 507,743, filed Apr. 12, 1990 now abandoned.

BACKGROUND OF THE INVENTION

This invention relates to methods and means for publishing images. More specifically, the invention relates to method and means for reproducing images such as works of art.

It is well-known that two-dimensional reproductions of images such as works of art can be produced via printing processes. In these processes, original images are photomechanically reproduced on a plate that is then used in a printing press to produce a two-dimensional facsimile of the original image. Various primary colors can be combined to faithfully reproduce the original colors contained in the original image.

It is well-known that three-dimensional images can be produced in deformable material such as paper and plastics via embossing. In such a process, an artist engraves or otherwise produces an image in a die. The die is then placed in a press and pressed against the deformable material. As a result, the deformable material is caused to have an exterior surface that follows the contour established by the die. Therefore, a three-dimensional surface can be produced.

In view of the foregoing, the state of the prior art is represented by known lithographic processes which reproduce images in contrasting colors, but in a flat two-dimensional form as well as embossing processes which reproduce images in three-dimensional form, but without coloration and fine detail.

SUMMARY OF THE INVENTION

The present invention provides a new method and means for reproducing images, such as works of art, wherein the reproduction images have both coloration and three-dimensional texture. Products produced by the new method and means can include a wide variety of products including a surface having a three-dimensional texture characteristic as well as color such as calendars, menus, catalogs, greeting cards, packaging or images including printed typographical and pictorial matter, or composites thereof.

An aspect of the invention is the formation of an embossing die that can be used to create three-dimensional reproductions of original three-dimensional images.

Another aspect of the invention is the formation of a quasi-original three-dimensional surface that can be used to create the embossing die discussed above.

While the process of the present invention is of a widespread applicability, a particularly useful exemplification thereof, which illustrates the applicable principles of the invention, is made in the reproduction on a carrier substrate of a textured colored work of art such as an oil painting on canvas. Such an exemplary process will be described as one species of the broad image publishing genus contemplated by the principles of the present invention.

In one exemplary aspect of the invention, a quasi-original proof or matrix of an original image is created with a texture or three-dimensional characteristic similar to that of the original image. The quasi-original proof or matrix is then used to produce an embossing die capable of transferring the texture of the quasi-original proof or matrix to a carrier substrate. The carrier substrate is photographically preconditioned via photomechanical means with a two-dimensional reproduction of the original image and the carrier substrate is then embossed by means of the die to replicate the textural characteristics of the original image so that the final product exhibits all the characteristics of both coloration and texture.

These and other features and aspects of the invention will become clearer with reference to the following detailed description of the presently preferred embodiments and accompanying drawings.

BRIEF DESCRIPTION OF THE DRAWINGS

FIG. 1 is a flow chart illustrating the general principles of the invention in terms of the different stages of the process practiced in accordance with the present invention;

FIG. 2 is a series of schematic views illustrating how the steps of the process are practiced;

FIGS. 3, 4, 5, 6, and 7 are views of various products which can be constructed in accordance with the invention.

DETAILED DESCRIPTION OF THE PRESENTLY PREFERRED EMBODIMENTS

Figure 8:
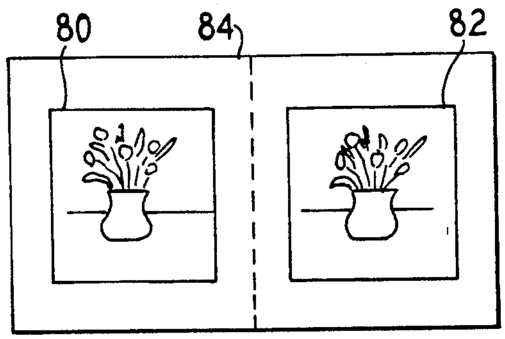
FIGS. 8–27 illustrate in greater detail a preferred embodiment of the process of FIGS. 1 and 2.

While the process of the present invention is of widespread applicability, a particularly useful exemplification thereof, which illustrates the applicable principles of the inventive improvements, is the reproduction of a textured colored work of art such as an oil painting on canvas onto a carrier substrate. Such exemplary process will be described as one species of the broad image publishing genus contemplated by the principles of the present invention.

As shown in FIGS. 1 and 2, a photomechanical imaging means 10 is provided for imaging an original artwork, in this case a painting 11. The photomechanical imaging means 10 is used to replicate image of the painting 11.

In order to reproduce the color variations of the subject image, color separations are prepared from the original artwork 11. A photograph of the painting 11 is taken and a colored positive transparency is produced. The color separation using a four-color or a six-color separation, or more if required, is prepared using an offset press and then printed on a selected material which is susceptible to embossing. It is contemplated by the present invention that suitable materials would be paper or paper-based products and also sheet-form plastic. One such example is a pvc coated sheet of about 300 microns in thickness which is commercially available as Mayfair (trademark) stock paper, although other papers having other display characteristics may be utilized.

In order to reproduce a three-dimensional colored image surface of an oil painting, it would be possible to use the painting itself as a matrix. However, alternatively, in the present process, particularly if it is desired to preserve the original, an early step in the process would be to create a semi-original proof or matrix depicted in FIG. 2 at 12 and which will reproduce the brushstrokes and/or the three dimensional characteristics of the original painting. The choice of the desired medium upon which the semi-original proof or matrix is made depends upon the extent of the three-dimensional depth to be reproduced. For example, if no texture is present other than the brushstroke itself, then a sheet of clear Mylar (trademark) or a similar substance may be used. If a canvas texture is desired and the painting exhibits deep relief as with heavy deposits of pigment made with a knife or painting tool, then a sheet of clear self-adhesive pvc may be used. Such products are commercially available under such trade names or trademarks DRYTAC (trademark) or SATINEX (trademark).

For example, to create a canvas texture on the semi-original proof or matrix, the desired size of the specimen is first determined and then two sheets of pvc material are cut to a size marginally larger than the semi-original proof or matrix which is required. The sheets are then perforated randomly and the backing is removed from each sheet and the sheets are stuck together. A piece of canvas is then applied on top of the sheet and heat and pressure is applied at sufficient values of pressure and temperature to effectively transfer the texture of the canvas. In one example of the inventive process, we have successfully applied 70 tons of pressure for about 10 minutes at about 120° C., whereupon the matrix 12 is cooled down to the temperature of the ambient, for example, room temperature. Other values could be used without departing from the spirit of the present invention.

In order to re-create the brushstrokes of the original painting, the assembly thus far provided is painted and coated, preferably with acrylic-based substances. Such substances are used because they are available in generally fast drying, versatile, flexible and extremely durable form. More importantly, acrylics hold texture and can be successively built up layer by layer to achieve an optimum texture corresponding to the brushstrokes and the three-dimensional characteristics of the original.

In order to accomplish such objective, a print is first made photomechanically of the original work of art to be reproduced. The print may be made on a carrier substrate such as a coated or uncoated paper or the print may be made on a sheet-form plastic material or, for that matter, the print may be made on a substrate such as glass. A palette knife may be used to form modeling paste which is made of an acrylic polymer latex emulsion, into a rough form of the original brushstrokes. An acrylic paint is then applied with a brush and the work is left to dry. Once dry, a clear acrylic varnish is coated on the entire semi-original proof or matrix to seal it. This varnish may have a gloss or a matte finish depending upon the image and the final effect desired.

If a heavier texture is desired, modeling paste may be used which has been mixed with marble dust and acrylic paint. With this combination, brushstrokes are more clearly defined than painting with just acrylics which tend to dry flat.

In order to create an embossing die component capable of transforming the texture of the semi-original proof or matrix onto a carrier substrate in a repetitively reliable manner, a brass backing plate 13 is prepared which is equal to the semi-original proof or matrix 12 in size. An acrylic plating module is first bonded with cement on one side of the brass plate and the back of the semi-original proof or matrix 12 is cemented to the other side of the brass plate 13.

The next step is to make the non-conductive surface of the semi-original proof or matrix 12 conductive. This can be accomplished by spraying the surface with silver and a reducing agent until the semi-original proof or matrix is completely covered and is completely free of pin holes or other infirmities. The result is a mirror finish of a thin electrically conductive coating of silver which is then rinsed in water.

One example of how such coating can be applied is to mix about 2.5 ounces of silver nitrate to about one gallon of water and to spray the silver and reducing agent onto the semi-original proof or matrix at the same time. The silver coating produced will be about one one-millionth of an inch in thickness. Other mixtures can be used without departing from the spirit of the invention.

The next step is to coat or plate the silver-coated semi-original proof or matrix electrolytically, for example, with a nickel plating. The semi-original proof or matrix 12 on the brass plate 13 is first connected to the electrical leads 14 and is placed in a nickel plating bath 15, plated with nickel from a supply of nickel 16 connected to electrical leads 17 and then removed and rinsed. By utilizing the electrolytic process, the nickel plating is deposited only on the silver coated side of the assembly.

If it is desired to coat the silver coated semi-original proof or matrix with an exemplary coating of say 24 thousandths of an inch of nickel plating, one exemplary bath is made of nickel sulfamate in aqueous solution comprising about 43.6 ounces of nickel sulfamate, 4.0 ounces of boric acid and about 3% anti-pitting agents in each U.S. gallon. In order to coat well, it is preferred to apply about 18 amperes per square foot using about 5 volts. The plating takes place over about a 24-hour period and will plate about one thousandth of an inch per hour. Other nickel coating techniques may be practiced in accordance with this invention.

The next step is to coat or plate the nickel-coated semi-original proof or matrix with a copper plating 18. Again, the nickel plated semi-original proof or matrix is placed in a copper plating bath, the electrical leads are connected, and electrical current in appropriate values is applied until the desired thickness is obtained.

In one example of a successful run, the semi-original proof or matrix 12 was provided with a minimum thickness of one-quarter of an inch to form a die component 18A. A bath was provided containing 26 ounces of copper sulphate, 9 ounces of sulfuric acid and 30 ppm chloride ions, per gallon of water. The semi-original proof or matrix 12 was placed in the bath, the electrical leads were connected and about 80 amperes per square foot were applied through the leads to the surface so that the plate thickness was achieved in the order of about ⅜ inch to about ½ inch. The plate was then removed from the bath and the electrical leads disconnected.

The semi-original proof or matrix is removed from the die and the acrylic material is cleaned from the textured side of the die 18A. It is not precisely known as to how much of the silver is removed when the semi-original proof is removed, but the effect is to leave a die made essentially of copper and nickel. The cooper growths are removed from the copper plated side of the die 18A and the die 18A is milled on the copper side to about ¼ inch in thickness, preferably flat.

Next, the photographic reproduction is embossed in order to apply texture to the print in such a manner that the texture of the original is matched to the coloration of the photomechanically produced print. A polymer based lacquer is added to the surface for protective purposes. In order to give the finished product rigidity, it may be laminated onto a backing such as a foam board. Another suitable backing is achieved by laminating the printed sheets to a chipboard sheet using a resin based adhesive material which is then cut to size.

In accomplishing the embossing, it is contemplated that a male die 18B will first be made from the female die component 18A and the die is then set into a press shown schematically in FIG. 2 at 19. The temperature is then elevated to a range from about 115° C. to about 155° C., and the pressure is set in a suitable range, for example in the order of about one ton per square inch. The printed sheets are shown at 100 and are fed into the embossing machine 19 and the texture is added by pressing the printed sheet 100 between the male and female die parts 18A and 18B and the camera ready art.

Simultaneously, a foil is applied and the heat from the press activates the wax release agent and the sizing agent, which then releases the foil polymer from the polyester and makes the sizing adhere to the printed sheet 100. The textured and coated sheet is then fed out of the press 19 while a new one is fed in during a continuous process.

One suitable type of machine is commonly referred to as a Bobst (trademark) letterpress type of printing process machine. The process uses foil, heat, impression and speed, as the elements of the process. Various chemicals are applied in a web printing fashion to a polyester or Mylar (trademark) to produce a foil having the desired characteristics. The chemicals are then applied by means of an embossing and stamping press which uses a combination of heat and pressure to transfer the foil to the printed substrate.

The process of the present invention has many applications. As depicted in FIG. 3 and as described in connection with the exemplary process used for illustrative purposes, it may be used to reproduce works of art such as shown at 20 and FIG. 3, which are themselves viewed and displayed as works of art.

Another useful area of application is in connection with the production of a calendar as shown in FIG. 4 at 30. The calendar may include a work of art 31 and a monthly calendar 32, and multiple sheets for the various months.

Another useful application can be made in connection with greeting cards such as the greeting card 40 illustrated in FIG. 5. Such greeting card may include pictorial matter as shown at 41 as well as printed or textural matter as illustrated at 42.

The principles of the present invention are especially applicable in the packaging art. In FIG. 6 is shown a special package 50 displaying a surface which may have characteristics of both coloration and three-dimensional texture on all or part of the package. For example, as illustrated in FIG. 6, there is a package which could be used to enclose perfume or some other cosmetic product and the package is shown as having a cylindrically outer casing 51 and provided with a top and bottom illustrated at 52. All or part of the package could display both coloration and three-dimensional texture.

In FIG. 7 there is shown an article 60 which could be a menu card or which may be a catalog scored and folded to provide a multi-page unit. It will be understood that the menu card 60 used in the illustration could display some form of printed article in which it is desirable to include images having both coloration and three-dimensional texture.

In FIGS. 8–27, a preferred embodiment of the process of FIGS. 1 and 2 for forming the embossing die 18A is illustrated in greater detail.

As illustrated in FIG. 8, with reference also to FIG. 2, as a first step, a photograph is taken of an original image 11 and the photograph is employed to produce printed two-dimensional duplications 80 and 82 of the image 11. The duplicate images 80 and 82 can be produced by regular printing processes such as color separation processes, as described above.

As illustrated, in the preferred embodiment, the two duplicate images 80 and 82 are produced in side-by-side relationship on a single carrier 84. The production of two duplicate images in side-by-side relationship permits one to work on one image while referring to the other. It should be understood that the dimensions of the duplicate images 80 and 82 can have the same dimensions as the original image 11 or can be enlargements or reductions thereof, the later being the usual case.

Figure 9:
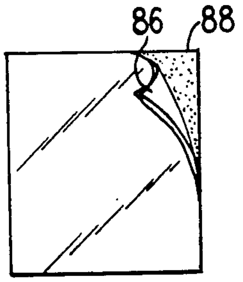
Figure 10:
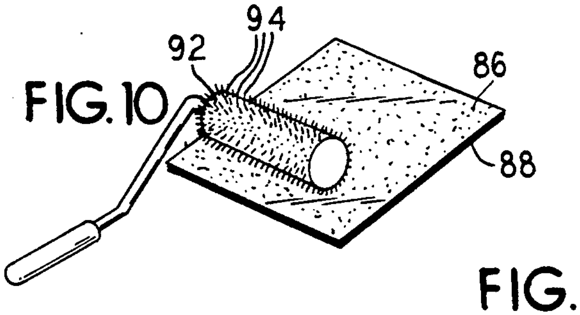
Figure 11:
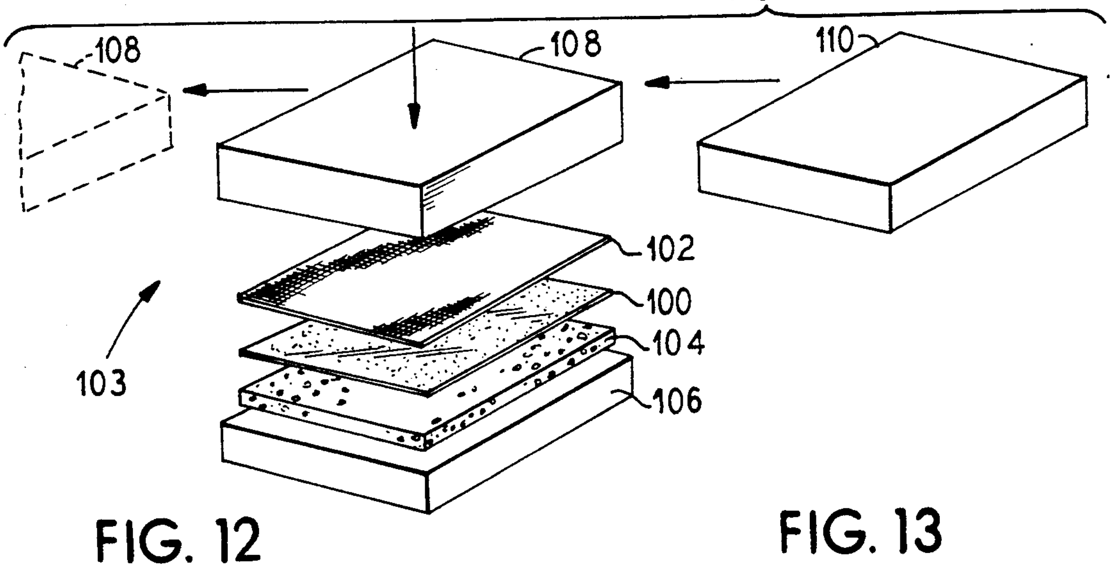

As a second step, illustrated in FIGS. 9–11, a three-dimensional matrix or quasi-original proof that mimics the textured surface of the original image 11 is created. To this end, a carrier substrate 100 that mimics the original carrier of the image 11 in texture is created and subsequently a textured surface that mimics the surface of the original image is applied thereto.

To this end, in the illustrated embodiment, two sheets 86 of the DRYTAC brand pressure-sensitive, adhesive-backed dry mounting laminating film (only one of which is illustrated in FIG. 9) are cut to a size slightly larger than one of the photomechanically generated duplicate images 80 and 82. For example, each sheet 86 can be out to overlap edges of one duplicate image 80 or 82 by about one-half (½) of an inch. Thus, for example, if the duplicate image 80 or 82 is rectangular and has dimensions of 16×20 inches, then the laminating film 86 will be cut into rectangular sheets measuring approximately 16½×20½ inches.

Once the laminating film sheets 86 have been cut, they are perforated by means of a roller 92 that has radially extending puncture members 94, as illustrated in FIG. 10. The roller 92 is rolled randomly so as to randomly perforate the laminating sheets 86 with a plurality of pin holes. These perforations are made to prevent trapping of air bubbles between the two sheets of laminating film 86 after they are stuck together as described below.

Once the sheets 86 have been perforated, the backings 88 thereof are removed and the sheets 86 are stuck together to form a single matrix sheet 100. Then, a texture similar to the texture of the original carrier of the original image is imparted to the matrix sheet 100.

In the preferred embodiment, the original carriers of the original images generally will be canvas. However, the present method is applicable to other original carriers as well such as wood, glass, etc. Canvas texture reproductions are preferred simply because, visually, they can be more pronounced.

To recreate the canvas texture, the matrix sheet 100 is pressed against a piece of canvas 102 at a temperature and for a time duration sufficient to impart the surface texture of the canvas 102 onto the surface of the matrix sheet 100. To this end, in the presently preferred method, illustrated in FIG. 11, the matrix sheet 100 is pressed against the canvas sheet 102 in a dry mounting press 103. A dry mounting sponge mat 104 is placed on top of a bottom plate 106 of the dry mounting press 103. Then, the matrix sheet 100 is placed on top of the dry mounting mat 104. Then, the sheet of canvas 102 is placed on top of the matrix sheet 100. Subsequently, an upper plate 108 of the dry mounting press 103 is urged toward the bottom plate 108 so as to press the mat 104, sheet of canvas 102, and matrix sheet 100 therebetween.

The upper plate 108, preferably is maintained at 110° C. so as to make the matrix sheet 100 pliable and deformable. The matrix sheet 100 then is pressed under a pressure of 70 tons per square inch for 10 minutes. After the 10 minutes have elapsed, the upper plate 108 is immediately replaced by another upper plate 110 which is maintained at a temperature of −10° C.; and the matrix sheet 100 is again pressed against the canvas sheet 102 under a pressure of 70 tons per square inch, for about one to two minutes, preferably 1.5 minutes. This step cools the matrix sheet 100 to a less deformable state so that it will retain its deformed texture.

As the result of the foregoing, the matrix 100 is a textured carrier that is used to produce a replication of the three-dimensional characteristics of the original image 11.

Figure 12:
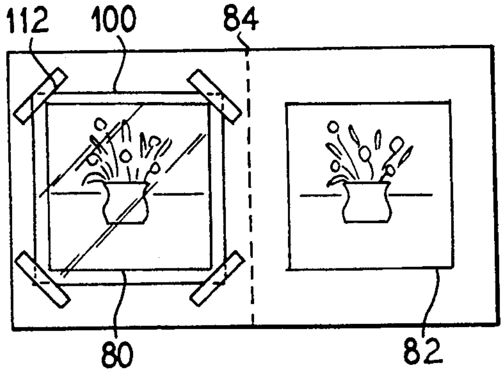
Figure 13:
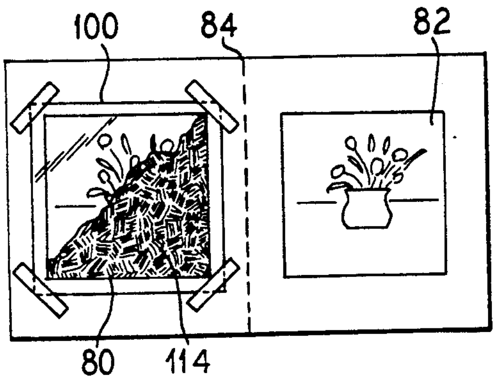

As illustrated in FIG. 12, the textured carrier 100 is positioned and secured over one of the duplicate images, e.g., the duplicate image 80. The textured carrier 100 can be secured over the image 80 by means of, e.g., adhesive tape 112.

Once the textured carrier 100 has been secured over one of the photo-reproduced images, an artist recreates thereon the brushstrokes of the original image 11, as indicated at 114, to create a quasi-original proof. The artist will have studied the techniques of the original artist sufficiently so that the artist can faithfully, or at least sufficiently, recreate the original brushstrokes used in creating the original artwork 11. Thus, it can be appreciated that the skill of the artist is very important in the making of quasi-original proof.

The artist recreates the original brushstrokes by painting a mixture on top of the textured carrier 100 to create the quasi-original. The artist follows the image on which the film is secured, e.g., image 80. However, the artist can refer to the alternate duplicate image adjacent thereto from time to time, e.g., image 82, because the image beneath the textured laminating carrier 100 may be either covered by the mixture or obscured by defracting light in the textured carrier 100 itself.

As discussed above, one mixture that has been successfully used comprises a mixture of acrylic paint and marble dust. The acrylic paint spreads easily while the marble dust provides body to the mixture so that the brushstrokes are thick.

While the artist will generally recreate the brushstrokes of the original image 11, the artist will also take into consideration several limitations in the overall process. For example, in the ultimate embossing step during which an end product is formed, there are limitations in the depths of crevices and the like that can be imparted into the end product. Currently, these depths range about ⅛ inch. The preferred paper, discussed below will tear at locations where these dimensions are exceeded. Thus, the artist will not create a brushstroke texture having raised portions such that the thickness of the quasi-original proof, including both the textured carrier 100 and the brushstroke surface, exceeds ⅛ inch.

Once the artist has completed the recreation of the original brushstrokes, the artist applies a coat of varnish over the painted surface of the quasi-original proof. This varnish preferably is common picture acrylic varnish, such as GLUMBACHER brand varnish. The semi-original proof is then ready for use in the creation of an embossing die 18A.

The presently preferred method for the creation of the embossing die 18A is illustrated in FIGS. 14 to 25.

In the preferred process for making the embossing die 18A, ultimately used to recreate the three-dimensional texture of an original image such as an artwork, in an end product, an electroform is made. The following description details the preferred process for forming the electroform.

Figure 14:
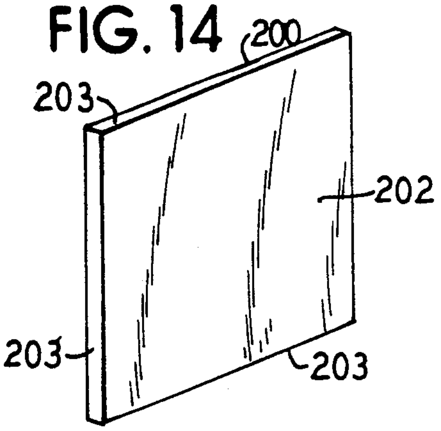
Figure 16:
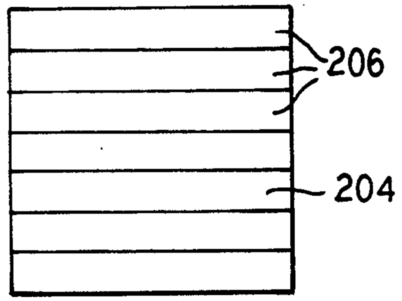
Figure 15:
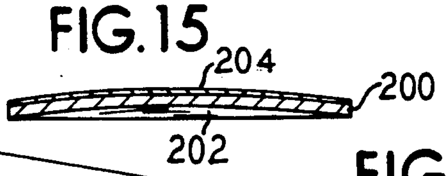

As a first step, illustrated in FIGS. 14 and 15 a brass electrolytic plate 200 having a thickness of approximately ⅛ of an inch is cut to a size slightly larger than the size of the quasi-original matrix 100 (or original matrix whose textured surface is to be reproduced). For example, if a quasi-original matrix 100 is rectangular and includes dimensions of 16½ inches by 20½ inches, the brass plate will also be rectangularly shaped and have dimensions of about 17 by 21 inches. These dimensions are representative and are not to be considered limitations on the invention.

In a second step, the brass plate 200 is deformed by pressing or hammering one side 202 thereof to impart a concavity to that side of the brass plate 200. Preferably, a concavity of approximately ⅛to 3/16 inches is imparted. Essentially, the brass plate 200 is deformed such that the center of the plate 200 has a depth of approximately of ⅛ to 3/16 of an inch relative to edges 203 of the plate 200. An opposite side 204 of the brass plate 200 then, of course, is imparted with a convexity.

Figure 17:
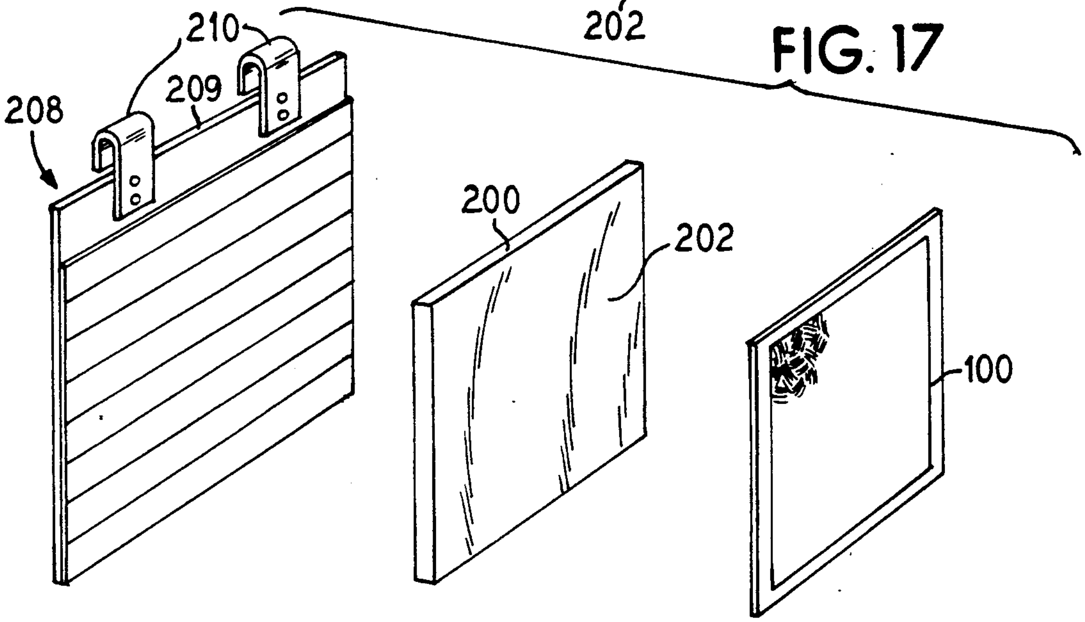

In a subsequent step, the deformed brass plate 200 is secured to a plating module 208, such as that illustrated in FIG. 17. As illustrated, the plating module 208 currently used comprises a rectangular sheet of plexiglass 209 that includes at a top edge thereof two copper hooks 210 that are used to hang the plating module 208 from a suitable electrode.

Before the brass plate 200 is secured to the plating module 208, the plating module 208 is coated on one side 211 with stop-off tape 212 to prevent acid attack. Preferably, the plexiglass sheet 209 is covered with one and one-half inch wide stop-off tape.

Similarly, the convex side 204 of the brass plate 200 is covered with the stop-off tape. Then, the tapped sides 204 and 211 of the brass plate 200 and the plating module 208, respectively, are cemented together with a suitable adhesive such as contact cement. A suitable contact cement includes LA PAGES brand gel contact cement.

Approximately 20 minutes are required for the contact cement to dry. Once the cement has dried, the quasi-original matrix 100 or original matrix is secured to the brass plate 200 with the same contact cement.

To secure the quasi-original matrix or original matrix to the brass plate, the backside, i.e., the non-painted side of the quasi-original 100 (or an original work) is coated with the contact cement as is the concave side 202 of the brass plate 200. Then, the quasi-original matrix 100 (or original work) is placed in somewhat centered fashion on the brass plate 200. A roller (not illustrated) is used to roll over the quasi-original matrix 100 or original matrix to eliminate any air bubbles in the contact cement.

It can be appreciated that during the rolling process, textured projections can break off or otherwise slightly crack to expose the acrylic paint of the quasi-original matrix 100 or of an original work. Accordingly, e.g., the quasi-original matrix 100 (or original work) is revarnished with an acrylic picture varnish to reseal the acrylic paint therein. A suitable acrylic varnish is manufactured under the brand name GRUMBACHER.

For the purpose of the remainder of this specification, unless specifically noted otherwise, the methods used in conjunction with a quasi-original matrix are identical to those that would be used in conjunction with an original work of art. However, as noted below, the quasi-original matrix or original work will be destroyed and, hence, it is preferred that only quasi-original matrices will be used.

Figure 18:
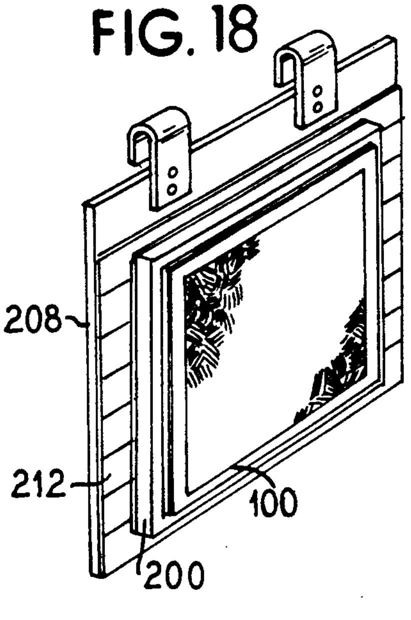

Once the quasi-original matrix 100 is secured to the brass plate 200, as illustrated in FIG. 18, the plating module 208 with brass plate 200 and quasi-original matrix 100 secured thereto are left to sit overnight for approximately 8 to 12 hours. This ensures that the contact cement has sufficiently dried.

Figure 19:
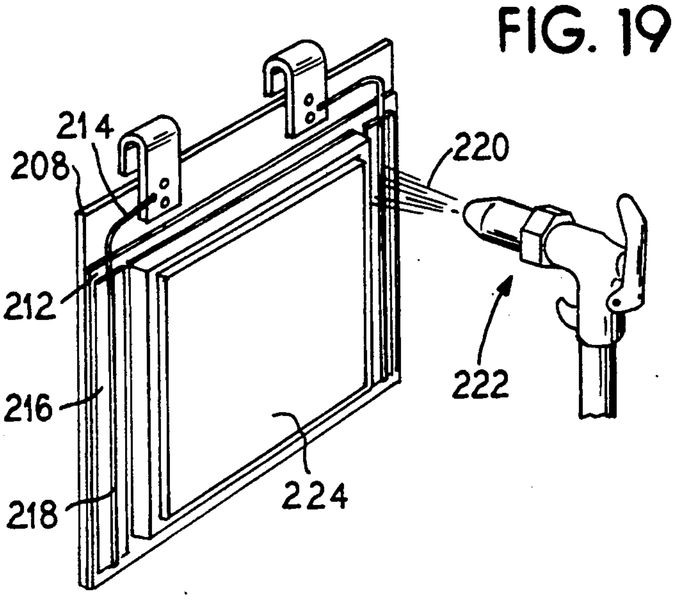

After the plating module 208 and attached brass plate 200 and quasi-original matrix 100 have been allowed to sit overnight for the approximately 8 to 12 hours, it is necessary to prepare the quasi-original matrix 100 for electroplating. To this end, electrical contact must be made between the copper hooks 210 of the plating module 208 and the painted surface of the quasi-original matrix 100. To accomplish the foregoing, an insulated wire 214 is positioned on the plating mode 208 along each lateral side of the brass plate 200, as illustrated in FIG. 19. The wires 214 are suitably attached to their respective copper hooks 210 and then secured to the sides of the brass plate 200 with duct tape 216. Subsequently, the tape 216 and wire insulation of the wires 214 are slit to expose copper wire 218 therein.

Following attachment of the electrical wires 214, the plating module 208 is placed in a spray booth and sprayed with silver as to coat the semi-original matrix 100 with a thin coating of silver 224. This thin coating of silver 224 is about $2^{-3}\times10^{-13}$ inches thick.

To this end, in a first spray, also illustrated in FIG. 19, a sensitizer 220 is sprayed over the surface of the brass plate 200 and the quasi-original matrix 100 with a single nozzle spray gun 222. The sensitizer includes tin chloride salt, free acid, and a wetting agent. A suitable sensitizer is manufactured by Peacock Lab. under the designation No. 93. The sensitizer acts as a catalyst and coats the surface of the quasi-original matrix 100 with tin.

Figure 20:
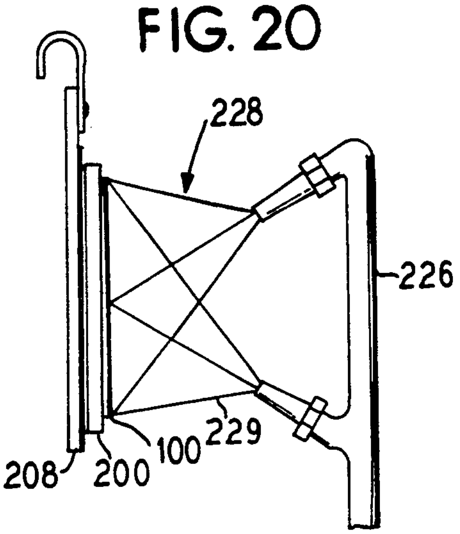

In a second spray operation, illustrated in FIG. 20, a two nozzle spray gun 220 is used to spray a silver fulminate solution and a silver reducer solution onto the surface of the semi-original matrix. To this end, a first nozzle 226A delivers a silver fulminate solution 228 having silver in suspension. A suitable silver fulminate solution is manufactured by Peacock Laboratories, Inc. of Philadelphia, Pa. under the designation S-30, and described in corresponding U.S. Pat. No. 4,102,702. In a second nozzle 226B, a silver reducer solution 229 also provided by Peacock Labs. is delivered, the silver reducer being manufactured under the designation No. R 30.

Because of the two spray nozzle configuration, the sprays 228 and 229 of the nozzles 276A and 226B, respectively, converge and react, almost instantaneously. The reacting sprays provide the mirrored surface of silver 224 on the quasi-original matrix 100 as described above.

In the preferred method, the two nozzle sprayer 226 is held about 6 inches from the surface of the quasi-original matrix 100 and the quasi-original matrix 100 is sprayed until it is pinhole-free. The resulting layer of silver 224 will be approximately 1 to $2\times10^{-6}$ inches thick.

Figure 21:
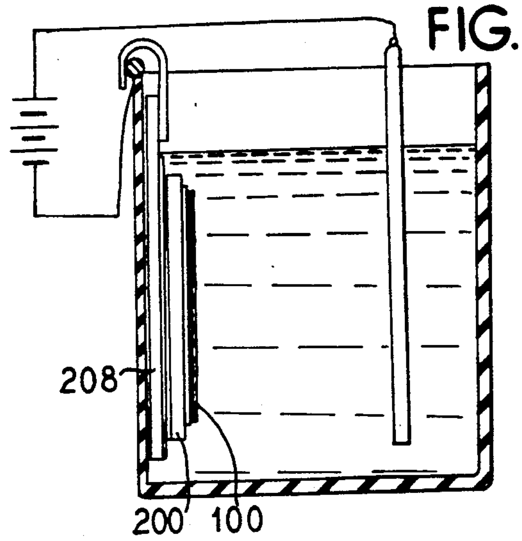

Following covering of the quasi-original matrix 100 with the layer of silver, the plating module 208 and attached quasi-original matrix 100 are placed in a nickel plating bath, as illustrated in FIG. 21. The bath preferably includes a chloride-free nickel sulfamate solution as described earlier.

In the nickel plating bath, the quasi-original matrix 100 and brass plate 200 are plated under low stress conditions. To this end, the quasi-original matrix 100 and brass plate 200 are plated within a tensile stress range of 2 to 6 $10^3$ pounds per square inch. To accomplish the foregoing, the nickel plating process occurs over two to two and one-half hours at a rating of approximately 5 amps per square foot. This results in approximately 12 amps total of plating.

This slow plating speed is maintained until a layer of approximately $\frac{1}{2}\times10^{-3}$ inches of nickel has built up over the silvered surface 224 of the quasi-original matrix 100. Then, the plating speed is gradually incrementally increased at two hour intervals by increasing the electroplating current. Then, the plating continues for approximately 8 hours until the plating current has increased up to about 48 amps. For example, the current can be increased by 5–6 amps every two hours or so.

To ensure that the tensile strength remains low, the plating module and resulting electroform are checked at the two hour intervals to see if the corners are pulling up on the quasi-original matrix 100. If the corners pull up, this is an indication of too much tensile stress and too high of a current. Thus, if the corners pull up, then the current is reduced until a sufficient build-up of nickel has accumulated.

Figure 22:
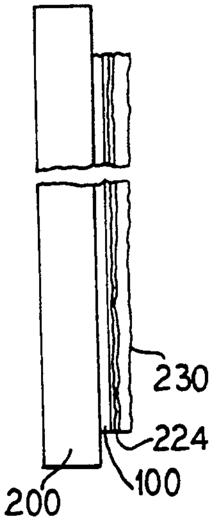

Following plating in accordance with the procedures set forth above, the quasi-original matrix 100 and brass plate 200 will be covered with a nickel electroform layer 230 approximately $30\times10^{-3}$ inches thick, as illustrated in FIG. 22.

Following nickel plating, the plating module 208 and attached components are placed in the copper sulfamate bath described above and the brass plate 200 and quasi-original matrix 100 are plated with copper. The copper plating takes place with a current draw of approximately 50 to 55 amps per square foot for approximately 6 days. After the first day, the plating module 208 and attached electroform are removed and a copper layer 232 formed thereon is smoothed to provide for subsequent even plating.

Figure 23:
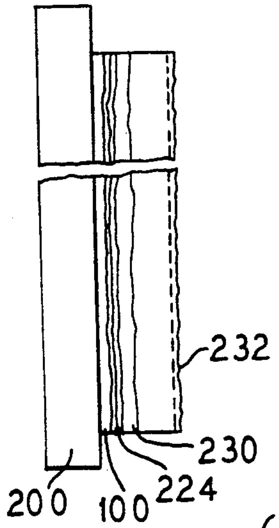

After 6 days with copper, the plating module 208 is removed so long as the least thickness of the overall electroform is at least one quarter of an inch thick, as illustrated in FIG. 23. If this is true, then the electroform is ready for removal from the plating module 208.

To remove the electroform, the connecting wires 214 are cut and the brass plate 200 is removed from the plating module 208. The brass plate 208 is then trimmed to remove excess plating material. Approximately one-eighth of an inch of trim is retained.

Subsequently, the copper surface 232 of the electroform 304 is milled smooth until a total electroform thickness of about $375\times10^{-3}$ inches remains. In the preferred method, it takes approximately one day to mill the copper surface 232 smooth.

It was previously discovered that during the process of milling the exposed surface of the copper layer 232, pressure exerted on the periphery of the electroform tended to cause the center of the electroform to project outwardly. Therefore, as described above, the brass plate 200 is provided with a concavity so that the electroform also is imparted with a slight concavity. It has been determined that this slight concavity prevents the outward projection of the electroform.

Following milling of the copper layer 232, the periphery of the electroform is trimmed slightly into the brass plate 200. This enables removal of the quasi-original matrix 100 from the electroform.

Figure 24:
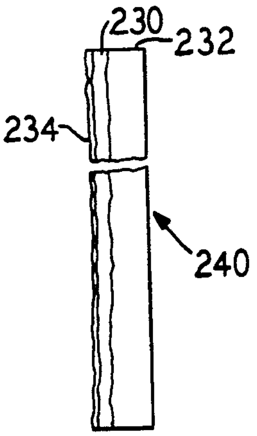

To remove the quasi-original matrix 100 from the electroform, the brass plate 200 and quasi-original matrix 100 are heated with a torch until the matrix 100 becomes pliable and separable from the electroform 304. Then, the brass plate 200 and matrix 100 are simply pried away from the electroform. The result is a female die 240 in the remaining electroform, as illustrated in FIG. 24.

It can be appreciated that due to the destructive nature of the removal process of the quasi-original matrix 100, if an original artwork is employed, it will be destroyed. Accordingly, for that reason in the preferred embodiment, the original artworks are recreated as set forth above.

Figure 25:
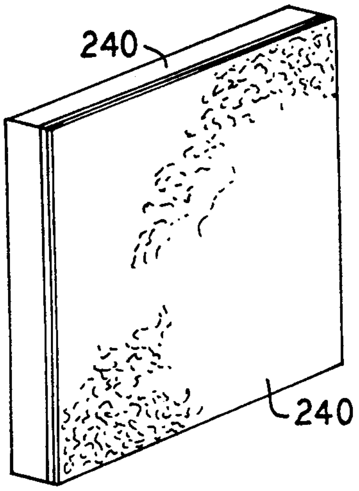

In FIG. 25, the resulting female embossing die 240 is illustrated in perspective view. As illustrated if the original dimensions of the duplicate image 80 and 82 were 16×20 inches, then the resulting female die will measure about 16×20 inches. Further, the die 240 will have a thickness of about ⅛ inch. It can be appreciated that these thicknesses are approximate only and are not to be construed as limitations.

Figure 26:
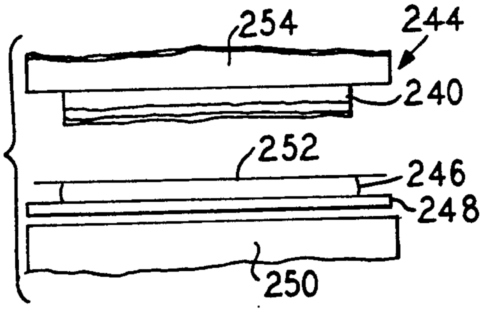
Figure 27:
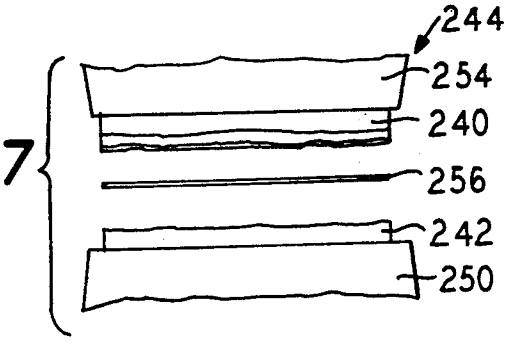

In FIG. 26, it can be seen that the female embossing die 240 formed as described above is then used to form a complementary male embossing die 242. Both are then used, as illustrated in FIG. 27, to emboss suitable materials to impart a textured surface identical to or a recreation of the textured surface of the image 11.

To this end, the female embossing die 240 is suitably secured in an embossing press 244 such as a Bobst letterpress. A formable mass 246 of dental acrylic is then placed on a fiber board 248 that in turn is positioned on a bottom metal base plate 250 of the press 244. The fiberboard 248 provides a cushioned surface against which the female die 240 can press without concern about damage to the textured surface of the female die 240.

It is understood that the dental acrylic mass 246 is placed on the fiber board 248 while it is still pliable. At the same time, a thin sheet of material 252, preferably 0.5 mil. thick Mylar brand plastic filler, is placed over the dental acrylic compound 246. Then the dental acrylic compound 246 is pressed between the female die 240 and the fiber board 248.

It is understood that during this pressing process, the dental acrylic compound 246 oozes into all of the nooks and crannies of the textured surface of the female die 240. When the acrylic compound 246 dries, it forms a durable male die 242 with a textured surface that is complementary to the textured surface of the female die 240.

When the acrylic compound 246 has hardened, the female die 240 is lifted and the dies 240 are separated with the assistance of the sheet of material 252.

In FIG. 27, it can be seen that to form end products with the female and male dies 240 and 242, the dies 240 and 242 are positioned to register with one another and a suitable sheet of embossing material 256 is positioned therebetween. Then the female die 240 and the male die 242 are urged toward one another until the embossing material 256 is sufficiently imparted with the textured surface of the original image 11. Preferably, the material is embossed at 1 ton per square inch.

In a preferred embodiment, the embossing material used is paper known in the industry as Cornwall coated 1/S (one side coated). The color preferably is white and has a thickness of 0.012 inches. Such a stock of paper is marketed by DOTMAR, INC.

As set forth above, the embossing material 256 is also imparted with a two-dimensional color (including black and white) duplication of the image via regular printing processes before it is embossed. Thus, the resulting end product includes both coloration (including black and white) and texture such that it is a recreation or nearly exact replication of the original image 11, but on a different carrier, namely the embossed material 256.

In addition to the foregoing, a hot stamp foil can be applied on the image surface of the embossing material 256. Such a foil can be used to bring out color contrasts and/or shines.

It should be noted that it has been discovered that, as a result of the foregoing method, no shrinkage problems in the replicate image result. This is because the printed image is not placed on a carrier laminated to another substrate. Instead, the printed image is in the embossed carrier 256 itself.

While a preferred embodiment has been shown, modifications and changes may become apparent to those skilled in the art that fall within the spirit and scope of the invention. It is intended that such modifications and changes be covered by the attached claims.

The embodiments of the invention in which an exclusive property or privilege is claimed are defined as follows:

1. The method of reproducing a multi-colored image having three-dimensional texture which includes the steps of:

(1) photomechanically printing a copy of the multi-colored image onto a carrier substrate;

(2) forming a three-dimensional matrix by (a) selectively thermoforming a backing substrate with a canvas texture similar to that of a canvas carrier substrate, (b) painting the backing substrate to form a painted surface texture similar to that of the multi-colored image;

(3) laminating the matrix to an electrolytic backing plate;

(4) electrolytically forming a female embossing die on the backing plate corresponding to the surface texture of the matrix;

(5) forming a male embossing die complemental to said female embossing die; and (6) squeezing the carrier of (1) between the male and female embossing dies of (4) and (5) to produce a copy exhibiting the coloration and three-dimensional textured configuration of the multi-colored image.

2. The method of claim 1, wherein step 2 comprises the step of texturizing a clear plastic foil to form a three-dimensional matrix corresponding to the three-dimensional textured configuration of the image.

3. A process for the production of a textured reproduction of an original work of art comprising:

creating a replica proof of the original work of art which proof has a surface texture substantially the same as a surface texture of the original work of art by first, thermoforming a texture on a backing substrate corresponding to the material on which the original work of art was made, and second, by painting a brush work surface texture onto the backing substrate corresponding to the brush work of the original artist;

producing complemental male and female dies from the proof capable of transferring the texture of the replica proof to a substrate; and embossing a substrate by means of compressing the substrate between the complemental dies to produce the reproduced work of art.

4. A process as claimed in claim 3, wherein said proof is made of a polyvinylchloride medium.

5. A process as claimed in claim 3, wherein said semi-original proof reproduces the brushstrokes of the original artwork in a destructible form that lends itself to electrolytic plating.

6. A process as claimed in claim 5, wherein said proof is a medium upon which acrylics are applied to re-create the brushstrokes of the original artwork.

7. A process as claimed in claim 3, wherein said female die is produced by applying the proof to a brass plate, coating completely said proof with silver, coating the silver-coated proof with a layer of nickel plating, coating said nickel plating with copper plating, removing the proof from the die and milling the die.

8. A process as claimed in claim 7, wherein said silver contains a reducing agent.

9. A process as claimed in claim 8, wherein said silver is applied by spraying a coating of a solution of silver nitrate and a reducing agent onto the replica proof.

10. A process as claimed in claim 9, wherein said silver is coated to a depth of about one one-millionth of an inch.

11. A process as claimed in claim 7, wherein said nickel is electrolytically deposited to a depth of about 24 thousandths of an inch.

12. A process as claimed in claim 11, wherein said nickel is deposited by immersing the assembly in a bath of nickel sulfamate in aqueous solution.

13. A process as claimed in claim 7, wherein said copper plating is electrolytically deposited to a depth of about one-quarter of an inch.

14. A process as claimed in claim 3, wherein said substrate is a colored sheet of polyvinylchloride.

15. A process as claimed in claim 3, wherein said substrate to be embossed is a colored sheet of polyvinylchloride mounted on a rigid backing.

16. A process as claimed in claim 3, wherein said embossing is accomplished by a letter press type of printing process.

17. A process for producing a textured reproduction of an original work of art which comprises the steps of making a proof of the original work of art having a surface texture substantially similar to that of the original work of art by first, thermoforming a texture into a backing substrate, corresponding to the texture of the material on which the work of art was made and second, by painting a surface texture onto the backing substrate corresponding to the brush work of the original artist; producing a female die by adhering said proof onto one side of a brass plate, coating said proof with silver, electrolytically depositing a layer of nickel thereon, electrolytically depositing a layer of copper on said layer of nickel, removing said proof, and milling said die to remove copper growths forming a complemental male die; and embossing a substrate with a texture substantially similar to that of said original work of art by pressing said substrate between said complemental dies.

18. A method for replicating a surface texture of an original image fixed in a substrate, comprising the steps of:

replicating a surface texture of the substrate in a carrier surface by thermoforming a carrier surface with a canvas substrate surface texture; and then replicating the brush stroke surface texture of the original image on top of the canvas substrate surface by painting.

19. The method of claim 18, wherein said step of replicating a surface texture of the substrate in a carrier surface comprises the step of pressing a similar textured surface against a deformable material until said deformable material retains a surface complementary to said similar textured surface.

20. The method of claim 19, wherein said step of replicating a surface texture of the substrate in a carrier surface comprises the step of:

providing a sheet of deformable plastic; and pressing a sheet of canvas against the sheet of deformable plastic until the sheet of deformable plastic is imparted with a surface texture similar to that of the sheet of canvas.

21. The method of claim 20, wherein the sheet of canvas and sheet of deformable plastic are pressed together in a drymounting press.

22. The method of claim 21, wherein the sheet of deformable plastic and sheet of canvas are pressed together under a pressure of 70 tons per square inch for a duration of about ten minutes and at a temperature of about 110° C.

23. A method for replicating a surface texture of a work of art fixed in a substrate, comprising the steps of:

providing a sheet of deformable plastic;

pressing a sheet of canvas and said sheet of deformable plastic together in a drymounting press at a pressure of about 70 tons per square inch, at a temperature of about 110° C. and for about 10 minutes such that a surface texture of said substrate is replicated in said sheet of plastic; and subsequently painting a mixture containing acrylic paint and marble dust on said deformable plastic in such a manner that said surface texture of said work of art is replicated of said sheet of plastic.

24. A method of reproducing a multi-colored image having three-dimensional texture, which includes the steps of:

(1) photomechanically printing a copy of the image onto a carrier substrate made of embossable material selected from the group consisting of cellulosic paper and plastic sheet film by affixing a pictorial print of the image to one face of said carrier substrate, which image has multiple colors displayed in an array of fine detail;

(2) providing a three-dimensional matrix corresponding to the image by texturizing a clear plastic sheet to form a three-dimensional matrix corresponding to the three-dimensional textured configuration;

(3) laminating the three-dimensional matrix to an electrolytic backing plate;

(4) forming a female embossing die electrolytically on the backing plate corresponding to the shape of the matrix;

(5) forming a male embossing die complemental to said female embossing die; and (6) squeezing the carrier of (1) between the male and female embossing dies of (4) and (5) to produce a copy exhibiting the coloration and three-dimensional textured configuration of the multi-colored image.

25. A process for the production of a textured reproduction of a brush-painted oil original work of art having texture produced by brush strokes and which includes the steps of:

(1) photo-mechanically printing a copy of an image of the original work of art onto an embossable sheet form by affixing a pictorial print of the original work of art onto one face of the embossable sheet form;

(2) creating a replica proof of the original work of art by applying acrylics to a medium to recreate the brushstrokes of the original work of art which replica proof then has the same texture as the original work of art in that said replica proof reproduces the brush strokes of the original art work in a destructible form;

(3) producing a die capable of transferring the texture of the replica proof to copies by:

a. first applying the replica proof to a brass plate to form a surface, b. then completely coating said replica proof surface with silver, c. thereafter coating the silver-coated replica proof surface with a layer of nickel plating, d. coating said nickel plating layer with copper plating, e. removing the replica proof from the die, and f. milling the die to smoothen one side of the die;

(4) forming a complemental male die; and (5) embossing the embossable sheet-form having the pictorial print of the original art work affixed thereto by means of the dies in a letter press type of printing process to produce the reproduced work of art in such a manner as to also depict the texture of the original work of art in the embossable sheet form.

26. A process as claimed in claim 25, wherein said replica proof is made on a polyvinylchloride medium.

27. A process as claimed in claim 25, wherein said silver contains a reducing agent.

28. A process as claimed in claim 27, wherein said silver is applied by spraying a solution of silver nitrate and a reducing agent onto the surface of the replica proof.

29. A process as defined in claim 28, wherein said silver is coated to a depth of one one-millionths of an inch.

30. A process as defined and claim 25, wherein said nickel is electrolytically deposited to a depth of about 24 thousandths of an inch.

31. A process as defined in claim 30, wherein said nickel is deposited by immersing the assembly in a bath of nickel sulfamate in aqueous solution.

32. A process as claimed in claim 25, wherein said copper plating is electrolytically deposited to a depth of about one-quarter of an inch.

33. A process as claimed in claim 25, wherein said sheet form copies constitute a colored sheet of polyvinylchloride.

34. A process as defined in claim 25, wherein said sheet form copies to be embossed comprise a colored sheet of polyvinylchloride mounted on a rigid backing.

* * * * *